United States Patent [19]

Miller et al.

[11] 4,065,537

[45] Dec. 27, 1977

[54] PROCESS FOR PRODUCING MOLDED GOLF BALLS EXHIBITING ISOMETRIC COMPRESSION

[75] Inventors: Richard Miller, Belle Mead; Murray H. Reich; Emma Kuntz, both of Princeton, all of N.J.

[73] Assignee: Princeton Chemical Research, Inc., Princeton, N.J.

[21] Appl. No.: 602,959

[22] Filed: Aug. 7, 1975

[51] Int. Cl.$^2$ .......................... B29G 1/00; B29G 7/00
[52] U.S. Cl. ...................................... 264/143; 273/62; 273/218; 260/42.47; 260/890; 264/142; 264/146; 264/152; 264/177 R; 264/320; 264/325; 264/331
[58] Field of Search ........... 264/148, 143, 152, 177 R, 264/245–247, 319, 320, 325, 331, 75, 294–296; 260/42.47, 41.5, 890; 273/218, 62

[56] References Cited

U.S. PATENT DOCUMENTS

| 2,093,652 | 9/1937 | Widmer et al. | 264/75 |
| 2,283,845 | 5/1942 | Brown | 264/75 |
| 3,313,545 | 4/1967 | Bartsch | 273/218 |
| 3,421,766 | 1/1969 | Chmiel et al. | 260/42.47 |
| 3,438,933 | 4/1969 | Bartsch | 264/331 |
| 3,553,159 | 1/1971 | Miller et al. | 260/890 |
| 3,671,477 | 6/1972 | Nesbitt | 273/62 |
| 3,784,209 | 1/1974 | Berman | 273/218 |
| 3,791,655 | 2/1974 | Schweiker et al. | 273/218 |
| 3,974,238 | 8/1976 | Schweiker et al. | 273/218 |

Primary Examiner—Jeffery R. Thurlow
Attorney, Agent, or Firm—Burgess, Dinklage & Sprung

[57] ABSTRACT

A golf ball comprising a substantially spherical homogeneous molded mass of elastomer highly cross-linked into a three dimensional network with long, flexible cross-links formed from a metal-containing cross-linkable monomer, said comonomer simultaneously functioning at least in part as a filler, said mass exhibiting substantially isometric compression across any diameter. Advantageously the elastomer comprises polybutadiene and said metal-containing cross-linkable monomer comprises zinc dimethacrylate present in about 15 to 60 parts per 100 parts by weight of the polybutadiene. The composition may additionally contain a small amount of zinc oxide. By proper selection of the shape and make up of the slugs from which the balls are molded or by particular techniques, e.g. laboratory sheeting mills, balls can be produced which have a maximum difference in compression across different diameters of about 5 units.

9 Claims, No Drawings

PROCESS FOR PRODUCING MOLDED GOLF BALLS EXHIBITING ISOMETRIC COMPRESSION

BACKGROUND OF THE INVENTION

The present invention relates to process for making molded products containing cis-polybutadiene or other elastomers, and a monomer capable of cross-linking the elastomer into a three-dimensional network. More specifically, the cross-links which are capable of being produced are relatively long and flexible. Such molding compositions are eminently suitable for the production of molded golf balls, particularly unitary molded golf balls. Molding compositions of this general class, and golf balls which can be produced from them, are described in U.S. Pat. Nos. 3,313,545, issued Apr. 11, 1967, and 3,438,933, issued Apr. 15, 1969.

There are several advantages of homogeneous, unitary construction for a golf ball, in contrast to the wound balls of the earlier art. Unitary golf balls can be produced with a perfect center of gravity and thus have excellent aero-dynamic properties, superior roll, and trueness of flight. Such golf balls are highly resistant to cutting and are often indestructible in normal play. These balls will return to round even when severely distorted, and thus maintain their superior flight characteristics after extended use.

Homogeneous, unitary golf balls, may be manufactured with better quality than conventional wound balls.

As contrasted with the conventionally covered wound balls, unitary balls maintain their playing characteristics in hot and in cold weather, have an excellent shelf-life, and will not waterlog. If the paint on the ball becomes worn or damaged, the balls may be very readily reclaimed by removing or stripping off the old paint and repainting. By contrast, conventional covered wound balls seldom last long enough to allow repainting.

Such unitary balls may be molded in mating precision hemisphere molds or dies into which a cylindrical or other shaped slug of moldable material is placed, as described in U.S. Pat. Nos. 3,313,535 and 3,438,933, the disclosures of which are incorporated herein by reference. The slugs may be cut from the extrudate of a mixer-extruder. After placing of the slug, of sufficient size to fill the mold, the mold halves are closed, and heat and presure are provided for enough time to cure the moldable elastomer. The moldable material comprises an elastomer, a cross-linking monomer, a filler and a cross-linking catalyst. The balls after discharge from the mold are buffed, surface treated and then painted and stamped in conventional manner.

Improved unitary molded golf balls are described in Application Ser. No. 250,147, filed on June 21, 1972, now pending. The improved unitary golf balls utilize a specific sub-group of cross-linking monomers and can yield molded golf balls with better rebound than prior unitary golf balls, and with superior playing qualities, equal to or surpassing the highest quality wound golf balls available, and maintaining the advantages of unitary balls. The improved unitary balls were made with decreased amounts of filler, preferably less than about 30 phr (parts per 100 parts by weight of elastomer) of filler and more preferably less than about 20 phr of filler. These low filler additions are postulated to give higher rebound and superior distance to these improved golf balls.

However, golf balls made commercially by the normal procedures described in Application Serial No. 250,147 tend to be non-uniform in compression, and roundness, and consequently are difficult to buff and stamp in the standard production equipment. As described in Application Ser. No. 250,147, these golf balls do possess superior distance qualities as compared to the standard unitary golf ball, but the improved golf balls have erratic flight patterns, sometimes veering to the left, sometimes to the right, and sometimes going straight.

While such balls are quite satisfactory, and do constitute an improvement over the standard unitary golf balls with respect to distance, rebound and click, it is an object of the invention to improve further the properties of such molded balls with respect to flight pattern, uniformity of compression, roundness, durability, and the like.

SUMMARY OF PRESENT INVENTION

It has been discovered that uniform and improved golf balls of isometric properties, i.e. having a maximum difference of 10 between the compressions taken across any diameters of the ball, and having superior flight pattern, excellent roundness, uniformity of compression and durability, can be reproducibly obtained by employing specially prepared slugs in the closed mold at the onset of cure. The improved balls are made without harming the superior distance, rebound and compression of the improved golf balls.

DESCRIPTION OF THE INVENTION

The elastomer preferred in the present invention is cis-polybutadiene containing at least 20% cis configuration.

The monomer generally comprises a normally solid metal compound of a polymerizable organic moiety, and a preferred group of such monomers are the metal salts of unsaturated, polymerizable organic acids. Preferably the monomer is soluble in the elastomer base; or readily dispersible in the elastomer under the usual conditions of rubber compounding; or else the monomer is capable of being formed in situ from at least one precursor which is readily soluble in the elastomer base.

An example of in situ formation is by predispersion of a suitable basic metal compound in the cis-polybutadiene rubber, such as zinc oxide or carbonate, followed by the addition of a suitable polymerizable acid, such as acrylic or methacrylic acid. The resulting monomer, zinc diacrylate or zinc dimethacrylate, is thus formed during compounding, and is therefore present in a desirably high degree of dispersion or solution in the elastomer matrix.

Examples of suitable metals include but are not restricted to zinc, magnesium, calcium, lithium, sodium, potassium, cadmium, lead, barium, zirconium, beryllium, copper, aluminum, tin, iron, antimony and bismuth. Polyvalent metals, i.e. those having a valence higher than 1, and especially the divalent metals zinc, magnesium, and calcium are a preferred sub-group.

Examples of metal salts of polymerizable organic acids include but are not restricted to salts of the following general formulas:

a. carboxylates, sulfonates, and sulfinates of the formulas $(RCO_2)_m \cdot M$, $R(SO_3)_m \cdot M$, $R(SO_2)_m \cdot M$, $(RCO_2)_p \cdot MO$, $(RSO_3)_p \cdot MO$, $R(SO_2)_p \cdot MO$;

b. phosphonates of the formulas $(R_2PO_2)_m \cdot M$, $(R_2PO_2)_r \cdot MO$, $(RPO_3)_9 \cdot M$, $(RPO_3) \cdot M'O$;

c. imide salts of the formulas

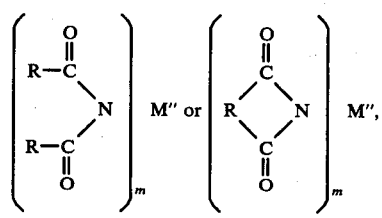

d. tin salts of the formula

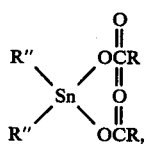

wherein
each R independently is a group having at least one polymerizable olefinic unsaturation,
R' is a divalent group having a polymerizable olefinic unsaturation,
each R" independently is an alkyl, aryl or aralkyl group,
M is a metal ion having a valence, $m$, of from 1 to 5,
M' is a metal ion having a valence of 4,
M" is a metal ion having a valence of 1 or 2,
$p$ is $m-2$ when $m$ is greater than 2, and
$q$ has the value $m/2$ when $m$ is 2 or 4.

In (a), (b), (c), and (d), the R's may be alkenyl, aralkenyl, alkenylaryl, heterocyclic, or cycloalkenyl, and contain halogen, nitro, cyano, keto, ester, ether and or amido substituents, provided that the metal containing crosslinking monomer contains at least one polymerizable olefinic unsaturation per molecule. The alkenyl radicals, when present, preferably are lower alkenyl and the aryl radicals, when present, are preferably phenyl, each of which may be substituted as indicated.

Mixtures of different metal-containing polymerizable monomers may also be used within the scope of the present invention, provided that at least one member of the mixture be homopolymerizable. Other members of the mixture may be copolymerizable or homopolymerizable, or else only copolymerizable. An example of the second type of monomer is zinc dimaleate, which is copolymerizable with zinc dimethacrylate but not homopolymerizable.

Mixtures of different metal-containing monomers may be used to advantage for the purpose of adjusting the polymerization rate or the final density of the ball; the density of the ball is desirably below about 1.13 and preferably between about 1.11 and 1.12, corresponding to a weight of about 1.5 to 1.62 ounces for a standard golf ball of about 1.68 to 1.685 inches in diameter. For example, zinc diacrylate when used as the sole metal-containing monomer polymerizes vary rapidly during curing, making the curing operation excessively exothermic and difficult to control. Thus, it may be advantageous to use mixtures of zinc diacrylate and zinc dimethacrylate in order to achieve a better balance of ease of processing, and final characteristics of the ball.

Examples of polymerizable salt-forming acids which are useful in the present invention are acrylic, methacrylic, 2-acetaminoacrylic, β, β-dimethacrylic, ethacrylic, α-chloroacrylic, 2-ethyl-3-propylacrylic, acotinic, β-benzoylacrylic, crotonic, aminocrotonic, allylacetic, 2-allyloxypropionic, 2-furfurylacrylic, vinylacetic, allyloxyacetic, 2-vinylpropionic, vinylhydrogen phthalic, β-acryloxypropionic, 2-butene-1,4-dicarboxylic, sorbic, acetylene dicarboxylic, N-butylmaleamic, maleic, chloromaleic, di-n-butylmaleamic, N,N-dimethylmaleamic, N-ethylmaleamic, N-phenylmaleamic, dichloromaleic, dihydroxymaleic, allylarsonic, chlorandic, fumaric, itaconic, styrenesulfonic, divinylbenzenesulfonic, styrenephosphonic, and styrenesulfinic acids; maleimide, and methylmaleimide. Methacrylic, acrylic, cinnamic, acotinic, crotonic, vinylacetic, itaconic, styrenesulfonic, and benzoylacrylic acids are a preferred sub-group.

The term "metal-containing polymerizable monomers" as employed herein includes such monomers which have been at least partially prepolymerized before compounding, or after compounding or processing, and before curing. Also included are salts of carboxylic polymers such as butadieneacrylonitrile-acrylic acid, acrylonitrile-butadiene-sorbic acid, styrene-butadiene-sorbic acid, butadiene-vinylacrylic acid, butadiene-sorbic acid, and the like, provided that these polymers contain residual polymerizable unsaturations. An advantage of using such prepolymerized cross-linking salts is that the amount of heat generated when the ball is cured is minimized, in contrast to using unpolymerized monomers. The reduced exotherm makes the molding operation more easily controlled.

The amount of the metal-containing cross-linking monomer should correspond to at least about 0.046 equivalent of polymerizable unsaturation per mole of butadiene in the elastomer base, but may be as high as 0.38 equivalent per mole. A preferred level of cross-linking monomer is about 0.08 to 0.28 equivalent per mole, while a more preferred range is about 0.10 to 0.23 equivalent per mole. Thus, if the cross-linking monomer selected is zinc dimethacrylate, the more preferred amounts are in the range of about 15 to 60 phr of zinc dimethacrylate.

Without departing from the scope of the present invention, mixtures of metal-containing and metal-free polymerizable monomers such as esters of unsaturated acids, may also be used. Examples of metal-free polymerizable monomers include but are not restricted to vinyl, allyl, methallyl, furfuryl, crotyl and cinnamyl esters of monobasic and polybasic acids such as acetic, propionic, butyric, benzoic, phenylacetic, chloroacetic, trichloroacetic, oxalic, malonic succinic, glutaric, adipic, pimelic, suberic, azelaic, sebacic, maleic, itaconic, citraconic, mesaconic, fumaric, citric, acotinic, phthalic, isophthalic, terephthalic, naphthalenedicarboxylic, mellitic, pyromellitic, tumesic, acrylic, methacrylic, ethacrylic, cinnamic, crotonic, cyanuric, polyolesters and anhydrides of acrylic, methacrylic, ethacrylic, crotonic, and cinnamic acids, the said polyols including ethylene glycol, di-, tri-, and tetraethylene glycol, glycerol, 1,3-butylene glycol, 1,4-butylene glycol, trimethylolpropane, pentaerythritol, propylene glycol, di-, tri-, and tetrapropylene glycols, polyethyene glycol, and polypropylene glycol; vinyl and divinyl benzene; allyl and di-allyl benzene; mono-, di-, triallylmelamine; allyl and diallylamine; allyl ether; allyl glycolates; mono-, di-, tri-, and tetraallyl and vinyl silanes; methyl, ethyl, propyl, butyl, pentyl, hexyl, benzyl, phenyl, cyclohexyl, chloroethyl, β-cyanoethyl, dimethylaminoethyl, glycidyl, lauryl, 2-methoxy-ethyl, tetrahydrofurfuryl, hydroxyethyl and hydroxypropyl esters of acrylic, methacrylic, ethacrylic, cinnamic, crotonic, cyanuric, fumaric, maleic, and methylmaleic acids; triallyl phosphate and phosphite. Further examples include low molecular weight reactive polymers such as polymers of butadiene, isoprene, chloroprene, and epoxidized derivatives of these materials.

A preferred group of metal-free polymerizable monomers are diacrylates and dimethacrylates of ethylene glycol, propylene glycol and butylene glycol, di-, and triacrylates and methacrylates of trimethylolpropane, and di-, tri- and tetraacrylates and methacrylates of pentaerythritol. In general, metal-free monomers containing more than one polymerizable unsaturation per molecule are preferred, but monoacrylates and monomethacrylates of polyols such as ethylene glycol are also highly suitable.

To vary the density so that the finished ball will have the desired weight and will not exceed the maximum allowable weight, filler may be required. However, because the metal-containing monomer will contribute a higher density to the stock than other types of monomers such as esters of unsaturated acids, the amount of filler required to adjust the density will usually and advantageously be relatively low. The metal-containing monomer may be considered to function as a receiver filler as well as a polymerizable cross-linking agent. In some cases, adjustment of the amount of metal-containing monomer is all that is necessary to obtain the correct ball density, so that no additional filler is required.

If an inert filler is desired, any known or conventional filler may be used which should be in finely divided form, as for example, in a form less than about 20 mesh, and preferably less than about 60 U.S. Standard screen size. Suitable fillers are silica and silicates, zinc oxide, carbon black, cork, titania, cotton flock, cellulose flock, leather fiber, plastic fiber, plastic flour, leather flour, fibrous fillers such as asbestos, glass and synthetic fibers, metal oxide and carbonates, and talc. Particularly useful is the oxide or carbonate of the same metal which is present in the metal-containing monomer. Impact modifiers such as ultra-high molecular weight polyethylene and acrylonitrile-butadiene-styrene resin can also be used. Reinforcing silicas can be used in combination with silanes to improve rebound of golf balls using silica alone as the filler or in combination with zinc oxide or other fillers.

The amount of inert filler is dictated mainly by its type and is preferably less than about 30 phr, i.e. of cis-polybutadiene elastomer base, and more preferably about 10 to 20 phr.

Advantageously, there is used a polymerization initiator which decomposes to produce free radicals during the cure cycle. The polymerization initiator need only be present in the catalytic amount required for this function and may be in general used in the amounts that the particular agent is generally used as a polymerization catalyst. Suitable initiators include peroxides, persulfates, azo compounds, hydrazines, amine oxides, ionizing radiation, and the like. Peroxides such as dicumyl peroxide, 1,1-di-t-butylperoxy-3,3,5-trimethylcyclohexane, di-t-butyl peroxide, and 2,5-bis(t-butylperoxy)-2,5-dimethylhexane are commercially available and conveniently used, usually in amounts of about 0.2–10% by weight of the elastomer.

An antioxidant may be added to the compound to minimize oxidation during processing and to prevent deterioration of the golf ball during storage. The antioxidant also prevents incipient polymerization and premature reaction during molding and prevents excessive temperature build up during molding of the golf ball. However, large amounts of antioxidant retard cure and can result in low compression golf balls. Most useful quantities of polymer antioxidants are about 0.03 to 4 phr, preferred quantities are about 0.1 to 2 phr, and most preferred are about 0.15 to 1.5 phr. Representative antioxidants are alkylidene bis, tris and polyphenols, and alkylated phenols and bisphenols. Other suitable antioxidants are disclosed in Patent Specification No. 3,886,683 issued June 3, 1975, the disclosure of which is incorporated herein by reference.

The method of adding the metal oxide, the maximum temperature during preparation of the compound, method of extruding, temperature of compound prior to shaping slug and molding temperature affect the quality of the golf ball with respect to uniformity, roundness, flight pattern, durability, click, and compression.

For the production of golf balls, the ingredients may initially be mixed intimately using, for example, rubber mixing rolls or a Banbury mixer, until the composition is uniform. In order to promote good dispersion, the metal-containing monomer may advantageously be formed in situ, for example from the metal oxide and the corresponding acid. The preferred method of preparation is the addition of the monomer over a period of about 1 to 20 minutes to from about ¼ to ¾ of the rubber-metal oxide mixture using from about 10% less than the equivalent amount to about a 100% excess equivalent amount of metal oxide, based on the amount needed to react with all the carboxyl groups, preferably about 80% excess and more preferably about 50% excess of metal oxide, mixing thoroughly and adding the remainder of the rubber-metal oxide mixture. The peroxide is added later. The mixing is desirably conducted in such a manner that the compound does not reach incipient polymerization temperatures.

Another preferred method is the addition of the unsaturated acid over a short period of time, e.g., about 0.2 to 6 minutes, to a mixture of the elastomer and metal oxide, mixing the ingredients, adding cross-linking catalyst, mixing further and dumping the batch.

The molded masses so far described are unitary golf balls, i.e. one-piece balls. With minor modifications, however, they can form the centers of two- or more piece golf balls including an outer cover, preferably of ionic copolymer. Such covers are known in the art and generally range in thickness from about 0.1 to 0.2 inch. The centers in such event will be somewhat higher in density to bring the overall density to the proper level. Thus, the quantity of filler is usually higher, e.g. about 20 to 40 phr and even as high as 50 phr.

In investigating prior golf balls and their production it was found that the history and contour of the slugs prior to molding had a pronounced effect on the properties of the golf balls molded therefrom. Thus, for example, extrusion of a cylindrical mass of about the diameter of the golf balls to be molded and cutting it into slugs produced lines of orientation in the slugs which were retained even after molding, notwithstanding the heat of molding which would have been expected to effect disorientation. Moreover, this effect was markedly more pronounced with masses including metal-containing monomers as in application Ser. No. 250,147, referred to hereinabove; apparently the fixed metal ions have a special orienting effect. At any rate, compression of golf balls measured parallel to the original orientation varied considerably from compression measured along diameters at right angles thereto and such latter compressions varied considerably from one another, often by as much as 20 units or more. These variations manifest themselves as variations in performance of the golf balls relative to one another as well as internally, i.e. the ball may veer to the left somewhat once but may veer to the right on the next drive.

In molding the balls the slugs can stand up in the mold or can be laid on their sides but, however, positioned, the spherical mold will produce an equator where the mold halves meet, which equator will be visible even after buffing of the balls, and this equator will define a pair of poles. Measurements of compression across the poles and across any two equatorial diameters at right angles to one another is a quick and fairly reliable way of ascertaining the variability within a given ball.

In accordance with the invention it was found that such variability could be minimized within each ball and from ball to ball by eliminating the effect of orientation insofar as possible. This can be done by utilizing a slug-forming technique which avoids orientation or by combining masses of material into slugs in such fashion that upon molding the individual orientations balance off against one another so the resulting ball is isometric, i.e. compression wherever measured is substantially the same. This isometricity can be achieved, for example, by employing relatively long, narrow slugs which, upon closing of the mold halves, will buckle like a column in filling the mold so that the original longitudinal lines of orientation will be arcuate or circular. Alternately, slugs made up of three or more sub-slugs (or even two, with special histories) and combined in particular spatial arrangements produce isometric balls. Use of rubber sheeting rolls rather than extruders, as well as higher temperatures, will tend to minimize the amount of orientation imparted and thus the amount of orientation to be overcome.

There follow details about several techniques in slug formation which will contribute to isometricity but they are merely illustrative and others may readily suggest themselves once the problem is in mind.

For example, the slug should not be wider than about 1.7 inches since that is the dimension of the mold cup and preferably should be in the range of about 0.7 to 1.5 inches. Although golf balls can be made using slugs having a diameter greater than about 1.7 inches, considerable waste of material results. The slug height should not exceed about 3.5 inches, since the slugs tend to topple in the mold cup causing loss of material and incomplete golf balls. Preferably heights for slug shapes are about 1.5 to 3.3 inches. A more preferred height for slugs which are to buckle is about 2.5 to 3.3 inches, approximately circular cylindrical slugs performing better at the greater lengths while cylinders with indentations, e.g. Maltese— cross of the like, performing satisfactorily even at the shorter lengths. Another consideration is the top and bottom shape of the slug. The most preferred shape is convex so that air is not trapped in the mold, leading to brown spots and/or incompletely molded areas on the surface of the golf ball. Approximately cylindrical slugs having essentially flat or convex top and bottom surfaces produce essentially brown-spot-free golf balls.

With these considerations in view, techniques to prepare slugs having shapes necessary to provide uniform golf balls will be described.

The mixture may be sheeted on a roll mill and the sheet rolled into a cylinder about 2.5 inches in diameter. The roll is cut into suitable slugs having multi-lines of orientation.

Another technique is to mill the stock on a warm mill, preferably about 40° to 60° C, and feed the warmed stock to a Barwell extruder - a ram type extruder. The stock is extruded through a Maltese cross or clover shaped die to give shapes which upon pressing in the mold give multi-oriented shapes.

Another technique is to sheet the stock on a mill, strip off 4-inch wide strips and feed the strips to a rubber-type extruder. The stock is extruded through a die to form a strand of approximately hemispherical cross-section. After cooling to room temperature, two strands are pressed together along their flat sides and cut into half-length slugs by a slug cutter. One half-length slug is separated and the components placed on top and bottom of a non-separated half-length slug to give a capped slug. Alternately, the slug can be molded as is to give a multi-oriented shape upon press closure.

Other shaped dies can be used to obtain the desired effect from extruded stock. Alternatively, sheets of stock can be cross-laminated to give a multi-oriented effect and suitably shaped slugs can be stamped out from the sheet, like shoe soles, to give suitably shaped slugs.

The molding is effected in mating, precision hemisphere molds or dies whose molding surface is covered with multiple regular projections to give the molded ball conventional dimpled or waffled surface appearance in order to improve its aero-dynamic characteristics. The molding is a simple, straight-forward operation effected in the conventional manner used in precision molding. The material, after being thoroughly mixed, is formed into suitably shaped slugs, as described herein, which will facilitate insertion in the mold, and proportioned so that the mold is fully filled. The mating halves of the mold are then closed so that the mold cavity is entirely filled. The mold halves may be held together with pressures between about 100 and 150,000 psi, preferably about 5,000 to 10,000 psi.

Molding temperature may vary depending on the particular composition used and may, for example, range between about 130° and 200° C. Curing times may range from about 1 to 50 minutes, and preferably about 5 to 30 minutes.

It is preferred to optimize the curing time and temperature in order to obtain the best properties of the golf ball. The best curing conditions are dependent upon the particular formulation selected. Because of the highly exothermic nature of the curing process, the properties of the present golf balls are highly sensitive to curing conditions, in contrast to the prior art balls made using only metal-free monomers.

After molding, the balls are removed from the mold and any mold marks buffed off, and the ball is painted and marked, and is then ready for use. Painting may be effected in the conventional manner using the conventional paints used for golf balls, as for example, enamel, polyurethane, epoxy, acrylic, or vinyl paints.

The resultant isometric gold balls have maximum differences of 10 compression units or less, often 5 units or less, when compression readings are taken at two or more places on the surface of the golf ball, typical places being the pole and two spots on the equator, although any other spots on the surface of the ball can be selected. The golf balls can have compression values from about 40 to 130, preferably about 50 to 120 and moe preferably about 60 to 110.

The term "Compression" in the golf ball industry relates to an arbitrary value expressed by a number which can range from 0 to over 100, and that defines the deflection that a golf ball undergoes when subjected to a compressive loading. The specific test is made in an apparatus fashioned in the form of a small press with an upper and lower anvil. The upper anvil is at rest against a 200-pound die spring, and the lower anvil is movable through 0.300 inches by means of a crank mechanism. In its open position the gap between the anvils is 1.780 inches allowing a clearance of 0.100 inches for insertion of the ball. As the lower anvil is raised by the crank, it compresses the ball against the upper anvil, such compression occurring during the last 0.200 inches of stroke of the lower anvil, the ball then loading the upper anvil which in turn loads the spring. The equilibrium point of the upper anvil is measured by a dial micrometer if the anvil is deflected by the ball more than 0.100 inches (less deflection is simply regarded as zero compression) and the reading on the micrometer dial is referred to as the compression of the ball. In practice, tournament quality balls have compression ratings around 90 or 100 which means that the upper anvil was deflected a total of 0.190 or 0.200 inches.

Another property which is measured in the following examples and/or in assessing performance of golf balls is the cannon life. The cannon life test is a measure of the durability of gold ball under severe impact conditions. In this test, a box is constructed of ½-inch thick steel plate in the shape of a rectangular prism with edges 2 ft. by 2 ft. by 3 ft. One end of a steel tube 1.687 inches in internal diameter by 5 ft. long is sealed to one 2 ft. by 3 ft. face of the box at a point which is one foot from a 2 ft. edge and the same distance from a 3 ft. edge. The axis of the tube is inclined 45° to a line parallel to the 2 ft. edge of said face, and 80° to a line parallel to the 3 ft. edge of the face. The other end of the tube is connected to a 20-gallon air tank via a fast-acting valve and contains a port for introducing a golf ball. The tube thus constitutes an air cannon.

In operation, the air tank is pressurized to 40 or 70 pounds per square inch, and the ball is shot into the box by sudden release of the air pressure. The "cannon life" is the average number of successive shots which a golf ball will withstand before rupturing or otherwise becoming unplayable. Usually about four to ten balls are tested for cannon life, and the results are averaged.

The invention will be further described in the following illustrative examples wherein all parts are by weight unless otherwise expressed.

EXAMPLE 1

To a No. 3A Banbury were added 72 pounds of 98% cis-polybutadiene, 27 pounds of 2/1 zinc oxide/cis-polybutadiene and 100 grams of antioxidant 2,2'-methylene bis(4-methyl-6-tertiary butyl phenol). The 98% cis-polybutadiene is Taktene 1203 made by Polysar Limited. The antioxidant is made by American Cyanamid Co. under the trade name of AO 2246. The ingredients were blended and 19 pounds of glacial methacrylic acid were added rapidly to the mixture and blended with the mixture. The masterbatch was sheeted on a plant mill (16 × 42"). The stock was returned to the Banbury and five pounds of Di-Cup 40C was mixed with the compound. The blend was dumped, sheeted and extruded through an oval shaped die to give slugs with a width across the cut face of 1 ⅜-inch, across the exposed side of 1 ⅜-inch and a height of 2 ⅜-inch. A typical slug gave compression at the pole of 107 and at the equator minimum compression value was 104 and maximum compression value was 120 for a difference at the equator of 16 points. These golf balls gave erratic flight patterns and veered to the right or left, slicing or hooking when hit by a hitting-machine, and somtimes would go straight without alteration of flight path. Compression data for other golf balls were:

| Compression Units | | | |
| --- | --- | --- | --- |
| Pole | Equator | | Diff. |
| 106 | 102 | 118 | 16 |
| 111 | 95 | 111 | 16 |
| 107 | 120 | 102 | 18 |
| 107 | 100 | 118 | 18 |
| 105 | 116 | 97 | 19 |
| 107 | 104 | 120 | 16 |
| 107 | 121 | 98 | 23 |
| 107 | 100 | 120 | 20 |
| 105 | 120 | 98 | 22 |
| 108 | 114 | 97 | 17 |
| 107 | 116 | 100 | 16 |
| 106 | 120 | 108 | 14 |
| 107 | 121 | 97 | 24 |
| 106 | 120 | 96 | 24 |
| 106 | 120 | 93 | 27 |
| 105 | 110 | 97 | 13 |
| 105 | 117 | 102 | 15 |

EXAMPLE 2

A blend was made of 266.7 grams of 98% cis-polybutadiene and 99.9 grams of a 2/1 zinc oxide/cis-polybutadiene masterbatch on a laboratory mill. To the blend was added 0.816 gram Antioxidant 2246, followed by 70.5 grams of glacial methacrylic acid. The ingredients were mixed thoroughly and 18.5 grams of Di-Cup 40C was mixed into the batch. The stock was sheeted, rolled and a slug having a diameter of about 1.5 × 1.25-inches and a height of about 2 inches was cut from the rolled sheet. The slug was molded at the edge of the press for 30 minutes at about 156° C. A golf ball has a compression of 94 at the pole and compressions of 94 and 97 at the equator. The golf ball had excellent feel and rebound and had true and consistent flight pattern. Another golf ball had compression values of 93 at three different points on the golf ball.

EXAMPLE 3

To the No. 3A Banbury were added 75 pounds of 98% cis-polybutadiene and 14 pounds of 2/1 zinc oxide/ cis-polybutadiene masterbatch containing 2,2'-methylene bis(4-methyl-6-tertiary butyl phenol). The ingredients were mixed thoroughly and 19.8 pounds of glacial methacrylic acid were pumped into the Banbury over a period of 7.5 minutes. The ingredients were mixed and 14 pounds of the 2/1 zinc oxide/cis-polybutadiene blend was added. The ingredients were blended, dumped, sheeted on a mill and returned to the Banbury where 5.25 pounds of Di-Cup 40C was blended into the batch. Stock was extruded through an oval die and slugs were cut across the cut face of the slug. One piece was rotated 90° and placed over the other piece. The final slug was about 2 ¼-inches high and about 1 ¼-inch × 1 ⅜-inches in area. Slightly less than half (about ⅜-inch) of each of the four faces of the slug consisted of a cut surface and slightly more than half (about 1 ⅜-inch) consisted of a skin surface. Slugs were molded at 155° C. Compression values were:

| Compression | | Difference | |
|---|---|---|---|
| Pole | Equator | Pole-Eq. | Eq-Eq. |
| 99 | 112 | 108 | 13 | 4 |
| 97 | 108 | 100 | 11 | 8 |
| 100 | 112 | 98 | 12 | 14 |

Another batch of golf balls was molded from a different production batch using the same slug preparation. Compression values for individual golf balls were:

| Compression | | Difference | |
|---|---|---|---|
| Pole | Equator | Pole-Eq. | Eq-Eq. |
| 85 | 96 | 97 | 12 | 1 |
| 93 | 105 | 97 | 12 | 8 |
| 99 | 107 | 100 | 8 | 7 |
| 96 | 103 | 98 | 7 | 5 |
| 95 | 112 | 94 | 17 | 8 |
| 95 | 107 | 95 | 12 | 12 |
| 95 | 106 | 104 | 11 | 2 |
| 93 | 110 | 106 | 17 | 4 |
| 95 | 107 | 101 | 12 | 6 |
| 95 | 111 | 106 | 16 | 5 |
| 97 | 108 | 98 | 11 | 10 |
| 90 | 106 | 96 | 16 | 10 |
| 90 | 106 | 98 | 16 | 8 |
| 70 | 88 | 80 | 18 | 8 |

Although there was a distinct improvement in the compression difference between the pole and the equator as compared to Example 1, the compression difference between the pole and the equator was high.

Stock from the first production batch was milled into 174-inch thich sheets. Two sheets were cross-laminated, and 50-gram slugs were prepared about 1.5-inches wide, 0.5-inch deep and about 3.5-inches long. The slugs were molded at 155° C. Compression values were:

| Compression | | Difference | |
|---|---|---|---|
| Pole | Equator | Pole-Eq. | Eq-Eq. |
| 104 | 108 | 101 | 4 | 7 |
| 100 | 112 | 106 | 12 | 6 |
| 109 | 112 | 97 | 12 | 15 |
| 101 | 110 | 98 | 9 | 12 |
| 98 | 110 | 102 | 12 | 8 |
| 102 | 112 | 103 | 10 | 9 |

Although the overall compression uniformity was improved compared to Example 1, the uniformity was not isometric, indicating more laminates are needed to eliminate the effect of orientation.

EXAMPLE 4

Compound made in the Banbury was extruded through a split half-moon die and cut into two-piece 50-gram slugs. Each half slug was 1.5 inches long, 1.5 inches wide at the flat inside and 12/16 inch deep. The two flat inside sections of the slug were sliced, to remove the skin, the two sections were pushed together and the skins were placed on the top and bottom halves so that no cut surfaces were exposed. The slugs were molded at 155° C for 30 minutes to give four golf balls with these compressions:

| At Pole | At Equator | | Max. Diff. |
|---|---|---|---|
| 96 | 94 | 89 | 7 |
| 94 | 96 | 90 | 6 |
| 88 | 88 | 78 | 10 |

Compound made in the Banbury was extruded through the split half-moon die, cut into 50-gram slugs as described above, the outside surfaces (skin) near the top and bottom were stretched and the two sections were pushed together to minimize the exposed amount of cut surface. Typical compression values for the golf balls were:

| Pole | Equator | | Max. Diff. |
|---|---|---|---|
| 99 | 96 | 92 | 7 |
| 102 | 97 | 90 | 12 |
| 96 | 96 | 90 | 6 |
| 100 | 96 | 90 | 10 |
| 101 | 97 | 90 | 11 |
| 97 | 95 | 87 | 10 |
| 98 | 98 | 89 | 9 |
| 100 | 95 | 89 | 11 |
| 99 | 98 | 94 | 5 |

Three golf balls had differences of 13 to 15. The differences of 11–15 were attributed to the memory of the batch, causing the slug to return to its original shape and exposing the cut and oriented surface.

EXAMPLE 5

To a π3A Banbury were added 71.25 pounds of 98% cis-polybutadiene and 14.6 pounds of 2/1 zinc oxide/-cispolybutadiene masterbatch. The ingredients were mixed and 17.1 pounds of glacial methacrylic acid were pumped into the Banbury. After the addition was completed, the batch was mixed and 12.0 pounds of 2/1 zinc oxide/cis-polybutadiene was dumped into the Banbury. The batch was mixed, dumped and sheeted on a plant 2-roll mill. The sheets were allowed to cool to room temperature.

The sheets were returned to the Banbury and 4.75 pounds of Di-Cup 40C were added. The ingredients were mixed, dumped and the compound sheeted on a plant mill.

Sheeted stock was mixed on a mill at a stock temperature of 34° C and extruded in a Barwell machine through a three-sided star (tri-clover shaped) die - 3-inch die ⅜-inch aperture, ⅛-inch land and 45° lead using a barrel temperature of 34° C to give a very irregular slug - through a 3-inch die with 15/16-inch aperture, ⅛-inch land, 45° lead with four-sided star design (Maltese cross shaped) to give 1 ⅝-inch diameter and 1 ¼-inch long slug, and through a 3-inch die with a diamond-shaped aperture to give a very irregular shaped slug that was not readily moldable. Seven golf balls made at 155° C using the clover shaped die had an average compression of 90, a pole-equator compression difference of 6.3 and a cannon life of 7, whereas 11 golf balls made at 155° C using the Maltese cross shaped die had an average compression of 97, a pole-equator compression difference of 12 and a cannon life of 3.

The compressions for the seven golf balls using the clover shaped die were:

| Pole | Equator | | Diff. |
|---|---|---|---|
| 91 | 90 | 82 | 9 |
| 91 | 95 | 91 | 4 |
| 85 | 96 | 92 | 11 |
| 95 | 93 | 87 | 8 |
| 88 | 92 | 89 | 4 |
| 90 | 92 | 90 | 2 |
| 88 | 94 | 90 | 6 |

The compression for the 11 golf balls using the Maltese cross shaped die were:

| Pole | Equator | | Diff. |
| --- | --- | --- | --- |
| 102 | 94 | 93 | 9 |
| 91 | 91 | 80 | 11 |
| 97 | 93 | 87 | 10 |
| 91 | 90 | 80 | 1 |
| 86 | 87 | 77 | 10 |
| 97 | 86 | 82 | 15 |
| 100 | 95 | 88 | 12 |
| 103 | 89 | 88 | 15 |
| 98 | 88 | 81 | 17 |
| 104 | 92 | 86 | 18 |
| 96 | 88 | 81 | 15 |

EXAMPLE 6

Compound made in Example 5 was mixed on a mill at 50° C using a barrel temperature of 40° C and extruded in a Barwell unit. The Barwell extruder is a hydraulically operated ram type extruder which uses vacuum to reduce the porosity of the extrudate and a constant speed cutter mounted on a flywheel to produce accurate blanks. Stock was extruded through a 3-inch die with ⅛-inch aperture, ⅛-inch land, 45° lead, and a three-sided star design with 1 3/16 inch diameter and 3 ⅛-inch long, and gave 17 golf balls having an average compression of 88, a pole-equator difference of 5.8 and a cannon life of 12. Slug size from this die was 1 3/16 -inch diameter and 3 ⅛-inch height.

Typical compression values for the golf balls were as follows:

| Pole | Equator | | Diff. |
| --- | --- | --- | --- |
| 88 | 94 | 93 | 6 |
| 85 | 93 | 90 | 8 |
| 88 | 92 | 90 | 4 |
| 90 | 93 | 91 | 3 |
| 88 | 97 | 90 | 9 |

Stock was extruded through a 3-inch die with 15/16-inch aperture, ⅛-inch land, 45° lead and with four-sided star design to give slug having 1 9/16 -inch diameter and 2 5/16 -inch height. The slugs were molded at 155° C to give eight golf balls having an average compression of 95, a pole-equator difference of 5.2 and a cannon life of 15.

Compression values for the golf balls were as follows:

| Pole | Equator | | Diff. |
| --- | --- | --- | --- |
| 98 | 89 | 89 | 9 |
| 97 | 91 | 88 | 9 |
| 88 | 88 | 85 | 3 |
| 97 | 95 | 92 | 5 |
| 95 | 97 | 97 | 2 |
| 93 | 92 | 90 | 3 |

Stock was extruded through a 3-inch die with a 15/16 -inch aperture, ⅛-inch land, 45° lead to give cylinder shaped slugs having a 1 ½-inch diameter and 2-inch height. The slugs were molded for 30 minutes at 155° C to give 21 golf balls having an average compression of 99, a pole-eqator difference of 12.9 and a cannon life of 14. The golf balls had a brown spot on one pole, indicating air was entrapped in the mold.

Typical compression values for the golf balls were:

| Pole | Equator | | Diff. |
| --- | --- | --- | --- |
| 103 | 88 | 87 | 16 |
| 98 | 86 | 85 | 13 |
| 93 | 84 | 86 | 9 |
| 102 | 85 | 86 | 17 |
| 101 | 88 | 88 | 13 |
| 91 | 84 | 86 | 7 |
| 99 | 84 | 83 | 16 |

In this series, golf balls having uniform compression properties and acceptable cannon life were made using clover and Maltese cross shaped slugs that were prepared by warming the stock to 50° C prior to Barwell extrusion. Essentially little orientation existed in the stock after milling at 50° C and the warm stock was not oriented by Barwell extrusion. Milling the stock at room temperature and extruding the relatively cold stock in the Barwell produced non-uniform golf balls.

EXAMPLE 7

To a π 3A Banbury were added 71.25 pounds of 98% cis-polybutadiene, 14.6 pounds of 2/1 zinc oxide/cis-polybutadiene. The ingredients were mixed thoroughly and 17.1 pounds of glacial methacrylic acid were pumped slowly into the Banbury. The ingredients were mixed and 12.0 pounds of 2/1 zinc oxide/cis-polybutadiene blend were added. The ingredients were blended, dumped, sheeted on a mill, and returned to the Banbury where 4.75 pounds of Di-Cup 40C was blended into the batch. Stock was extruded through a split-die (half-moon) 1 ⅛-inch long by ½-inch at the center of the half-moon. The extrudates were allowed to cool to room temperature. Then two strings were pressed together and 50-gram slugs were cut. The slugs were about 1 ⅞-inches high, 1.5-inches wide. Typical compressions of golf balls from two production runs were as follows:

| Production Run 1 | | | | |
| --- | --- | --- | --- | --- |
| | | | | Diff. |
| Pole | Equator | | P-E | E-E |
| 100 | 83 | 83 | 17 | 0 |
| 99 | 88 | 83 | 16 | 5 |
| 100 | 85 | 83 | 17 | 2 |
| 96 | 84 | 83 | 13 | 1 |
| 97 | 86 | 86 | 11 | 0 |
| 98 | 85 | 85 | 13 | 0 |
| 101 | 86 | 84 | 17 | 2 |
| 98 | 82 | 81 | 17 | 1 |
| 96 | 82 | 81 | 15 | 1 |
| 102 | 85 | 84 | 18 | 1 |
| 100 | 83 | 80 | 20 | 3 |
| 100 | 82 | 82 | 18 | 0 |

| Production Run 2 | | | | |
| --- | --- | --- | --- | --- |
| Pole | Equator | | P-E | E-E |
| 100 | 85 | 84 | 16 | 1 |
| 99 | 86 | 86 | 13 | 0 |
| 97 | 84 | 83 | 14 | 1 |
| 97 | 86 | 85 | 12 | 1 |
| 102 | 88 | 87 | 15 | 1 |
| 99 | 85 | 84 | 15 | 1 |
| 101 | 88 | 86 | 15 | 2 |
| 95 | 85 | 81 | 14 | 4 |
| 99 | 82 | 82 | 17 | 0 |
| 103 | 88 | 88 | 15 | 0 |
| 95 | 85 | 85 | 10 | 0 |
| 96 | 86 | 85 | 11 | 1 |

EXAMPLE 8

To a π3A Banbury were added 70 pound of 98% cispolybutadiene, 14.3 pounds of 2/1 zinc oxide/cispolybutadiene. The ingredients were mixed thoroughly and 17.3 pounds of glacial methacrylic acid were pumped slowly into the Banbury. The ingredients were mixed and 11.8 pounds of 2/1 zinc oxide/cis-polybutadiene was added. The ingredients were blended, dumped, sheeted on a mill, and returned to the Banbury where 3.5 pounds of Di-Cup 40C was blended into the batch. Stock was extruded through a split-die (half-moon shape) described in Example 7 to give 25-gram slugs about 1 ¼-inch long and about 1 ½-inch wide across and about 1 ⅛-inch wide along the flat side.

The extrudates were allowed to cool to room temperature. Two strings were pressed together and 25-gram slugs were cut. Every other pair of cut slugs was separated and the two halves were placed over the top and bottom half of a non-separated pair so that the uncut surfaces rested on the cut surfaces of the non-separated pair and so that the cut surfaces of the separated pair were horizontal and constituted the only exposed cut surfaces. Also, the round surfaces of the half moon nestled into the round surfaces of the cup molds. The slug was about 2.5-inches high and 1 ¼ × 1 ⅜-inch in area. The slug was molded for 30 minutes at about 155° C.

Typical compression values for individual golf balls were:

No. 1

| Compression | | | Diameter | | |
|---|---|---|---|---|---|
| Pole | Equator | Diff. | Pole | Equator | Diff. |
| 94 | 98 | 4 | 1.683 | 1.685 | 8 |
| 95 | 97 | 2 | 1.682 | 1.680 | 2 |
| 99 | 101 | 2 | 1.671 | 1.674 | 3 |
| 95 | 101 | 6 | 1.678 | 1.685 | 7 |
| 89 | 89 | 0 | 1.675 | 1.673 | 2 |
| 98 | 100 | 2 | 1.682 | 1.678 | 4 |
| 97 | 99 | 2 | 1.678 | 1.684 | 6 |
| 97 | 103 | 6 | 1.678 | 1.674 | 4 |
| 91 | 100 | 9 | 1.674 | 1.678 | 4 |
| 92 | 95 | 3 | 1.675 | 1.676 | 1 |
| 88 | 91 | 3 | 1.672 | 1.678 | 6 |
| 101 | 102 | 1 | 1.671 | 1.678 | 7 |
| 93 | 98 | 5 | 1.677 | 1.676 | 1 |
| 96 | 104 | 8 | 1.677 | 1.682 | 5 |

No. 2

| 86 | 94 | 92 | 8 |
| 96 | 95 | 94 | 2 |
| 97 | 89 | 88 | 9 |
| 91 | 98 | 91 | 7 |
| 92 | 95 | 90 | 5 |
| 92 | 96 | 86 | 10 |
| 93 | 97 | 87 | 10 |
| 97 | 99 | 89 | 10 |
| 90 | 94 | 93 | 4 |
| 93 | 97 | 89 | 8 |

EXAMPLE 9

To a π 3A Banbury were added 70 pounds of 98% cispolybutadiene, 14.3 pounds of 2/1 zinc oxide/cis-polybutadiene. The ingredients were mixed and 18.1 pounds of glacial methacrylic acid were added slowly and 14.3 pounds of 2/1 zinc oxide/cis-polybutadiene was added. The ingredients were blended, dumped, sheeted on a mill, and returned to the Banbury where 3.5 pounds of Di-Cup 40C was blended into the batch. Stock was extruded through a 1-inch dented circle die, the dents having ¼-inch sides and using a piano wire across the face of the die to give two extrudate strings. The extrudates were allowed to cool to room temperature and fed to a slugcutter to obtain slugs about 2 ¾-inches long and about 1 ¼-inches wide. The slugs were molded into golf balls. The golf balls had a cannon life of 16, 17 and 17 for three individual balls. Typical compression and roundness data for the golf balls were:

| Compression | | | Diameter | | |
|---|---|---|---|---|---|
| Pole | Equator | Diff. | Pole | Equator | Diff. |
| 97 | 92 | 5 | 1.690 | 1.685 | 5 |
| 88 | 94 | 6 | 1.685 | 1.688 | 3 |
| 90 | 89 | 1 | 1.685 | 1.678 | 7 |
| 97 | 92 | 5 | 1.690 | 1.685 | 5 |
| 88 | 94 | 6 | 1.685 | 1.688 | 3 |
| 90 | 89 | 1 | 1.685 | 1.678 | 7 |
| 83 | 93 | 10 | 1.675 | 1.678 | 3 |
| 86 | 93 | 7 | 1.680 | 1.680 | 0 |
| 83 | 88 | 5 | 1.675 | 1.673 | 2 |
| 78 | 88 | 10 | 1.674 | 1.676 | 2 |

EXAMPLE 10

To a π 3A Banbury were added 26 pounds of a 130/65/0.88 zinc oxide/cis-polybutadiene/2.2′-methylene bis (4-methyl-6-tertiary butyl phenol) masterbatch and 70 pounds of cis-polybutadiene. The ingredients were mixed for 1 minute and 18.3 pounds of glacial methacrylic acid were added over a 4-minute period. The ingredients were mixed for 8 minutes and 3.5 pounds of Di-Cup 40C were added. The ingredients were mixed for several minutes, dumped, sheeted on a plant mill and extruded through a split die. The extrudate was cut into slugs which were molded 30 minutes at 155° C. Each slug consisted of four sections, 1 ⅛-inch long, ⅜-inch deep across the half-moon section and 1 ¼-inch wide along the half-moon section. Two pieces were placed together along the flat sides and one piece was placed flatside down on the top side and the other was placed flatside up on the bottomside. The slugs were preweighed to 48.5 and 49.0 grams. Compression values for individual golf balls were:

| Compression | | Difference | |
|---|---|---|---|
| Pole | Equator | Pole-Eq. | Eq-Eq. |
| 48.5-gram Slugs | | | |
| 88 | 90 | 85 | 3 | 5 |
| 93 | 98 | 89 | 5 | 9 |
| 87 | 87 | 85 | 2 | 2 |
| 88 | 88 | 85 | 3 | 3 |
| 82 | 84 | 80 | 2 | 4 |
| 82 | 90 | 88 | 8 | 2 |
| 81 | 87 | 84 | 6 | 3 |
| 92 | 91 | 90 | 2 | 1 |
| 90 | 92 | 90 | 2 | 2 |
| 92 | 90 | 89 | 3 | 1 |
| 85 | 84 | 80 | 5 | 4 |
| 83 | 85 | 83 | 2 | 2 |
| 85 | 85 | 83 | 2 | 2 |
| 90 | 92 | 91 | 1 | 1 |
| 94 | 103 | 95 | 9 | 8 |

| Compression | | Difference | |
|---|---|---|---|
| Pole | Equator | Pole-Eq. | Eq-Eq. |
| 49.0-gram Slugs | | | |
| 87 | 95 | 93 | 8 | 2 |
| 92 | 94 | 93 | 2 | 1 |
| 93 | 95 | 90 | 3 | 5 |
| 94 | 95 | 86 | 8 | 9 |
| 91 | 91 | 92 | 1 | 1 |
| 93 | 93 | 91 | 2 | 2 |
| 96 | 91 | 90 | 6 | 1 |
| 87 | 92 | 90 | 5 | 2 |

EXAMPLE 11

To a π 3A Banbury were added 43.1 pounds of a 124/62 zinc oxide/98% cis-polybutadiene masterbatch and 65.6 pounds of 98% cis-polybutadiene. The ingredients were mixed for one minute and 15.2 pounds of glacial methacrylic acid with 108.8 grams of 2,2'-methylene bis(4-methyl-6-tertiary butyl phenol) were added over a period of four minutes. The ingredients were mixed for 15 minutes and 4 pounds of Di-Cup 40C were added. The ingredients were mixed, dumped, sheeted on a plant mill, and extruded through a split die. The strands were cut into 25-gram slugs; each slug consisted of two sections. The sections were ⅝-inch deep, 1.5-inches long along the half-moon and about ¾-inch high at the center of the half-moon. A pair was separated and the flat part of one section was placed on top and the other on the bottom of another pair. The final slug was about 1-⅝ inch wide, 1-⅜-inch deep and 2-¼-inch high. Several slugs were prepared by this method. The slugs were molded for 15 minutes at 175° C. Compression values were:

| Polar | Equatorial | |
|---|---|---|
| 54 | 52 | 50 |
| 51 | 50 | 47 |
| 49 | 44 | 53 |
| 55 | 58 | 55 |
| 52 | 54 | 54 |
| 51 | 55 | 53 |
| 58 | 60 | 55 |
| 48 | 51 | 48 |
| 56 | 60 | 54 |

The centers can be converted into two-piece golf balls by molding ionomer compolymers onto the centers at 150° C.

EXAMPLE 12

To a π 3A Banbury were added 56 pounds of 98% cispolybutadiene, 23 pounds of silica, 10 pounds of high molecular weight polyethylene, 400 grams of titanium dioxide, 800 grams each of magnesium oxide and Di-Cup 40C and 200 grams of antioxidant 2,2'-methylene bis(4-methyl-6-tertiary butyl phenol). The ingredients were mixed for one minute and 22 pounds of trimethylol propane trimethacrylate was added. The batch was mixed for 9 minutes, dumped, sheeted and extruded through the oval shaped die described in Example 1. Golf balls were molded at 175° C using the slugs described in Example 1. Compression data were:

| Polar | Equatorial | |
|---|---|---|
| 92 | 92 | 92 |
| 88 | 88 | 85 |
| 85 | 83 | 83 |
| 80 | 82 | 82 |
| 92 | 92 | 90 |
| 83 | 83 | 78 |
| 85 | 81 | 81 |
| 85 | 88 | 85 |
| 84 | 82 | 78 |
| 87 | 88 | 87 |
| 78 | 82 | 78 |
| 88 | 84 | 80 |

It will be appreciated that the instant specification and examples are set forth by way of illustration and not limitation, and that various modifications and changes may be made without departing from the spirit and scope of the present invention.

What is claimed is:

1. In the production of a molded golf ball wherein a cross-linkable elastomer is continuously extruded through a die to form an extrudate, said extrudate is cut into slugs of the appropriate predetermined mass, and said slugs are molded in golf ball molds to form golf balls, the improvement which comprises forming said extrudate and cutting it so as to produce approximately cylindrical slugs about 2.5 to 3.3 inches long and having substantially flat or convex top and bottom surfaces, whereby the resulting golf balls are isometric.

2. The process of claim 1, wherein said extrudate comprises an elastomer, a metal-containing cross-linkable monomer in part functioning as a filler, and an additional filler in up to about 50 parts per 100 parts by weight of said elastomer.

3. The process of claim 2, wherein said elastomer comprises polybutadiene, said metal containing cross-linkable monomer is present in about 15 to 60 parts per 100 parts by weight of the polybutadiene and comprises a salt of at least one metal selected from the group consisting of zinc, magnesium and calcium, and at least one acid selected from the group consisting of methacrylic, acrylic, cinnamic, acotinic, crotonic, vinylacetic, itaconic, styrenesulfonic and benzoylacrylic acids.

4. The process of claim 2, wherein said golf ball is a unitary golf ball, said elastomer comprises polybutadiene, said metal containing cross-linkable monomer is present in about 15 to 60 parts per 100 parts by weight of the polybutadiene and comprises a salt of at least one metal selected from the group consisting of methacrylic, acrylic, cinnamic, acotinic, crotonic, vinylacetic, itaconic, styrenesulfonic and benzoylacrylic acids, and said filler comprises about 10 to 20 parts by weight of zinc oxide per 100 parts by weight of the polybutadiene.

5. In the production of a molded golf ball wherein a cross-linkable elastomer is continuously extruded through a die to form an extrudate, said extrudate is cut into slugs of the appropriate predetermined mass, and said slugs are molded in golf ball molds to form golf balls or golf ball centers, the improvement which comprises subdividing each slug into sub-slugs and assembling a plurality of sub-slugs into a new slug wherein the initially parallel longitudinal directions of said sub-slugs are at angles to one another in said new slug, whereby the resulting golf balls are isometric.

6. A process according to claim 5, wherein each new slug comprises at least three sub-slugs, a central short sub-slug capped on top and bottom by halves of another short sub-slug, said halves being formed by a longitudinal diametric cut and being placed with their cut faces contacting the top and bottom of said central sub-slug so as to leave exposed only minimal areas of the cut faces and ends of said sub-slugs.

7. The process of claim 5, wherein said extrudate comprises an elastomer, a metal-containing cross-linkable monomer in part functioning as a filler, and an additional filler in up to about 50 parts per 100 parts by weight of said elastomer.

8. The process of claim 7, wherein said elastomer comprises polybutadiene, said metal containing cross-linkable monomer is present in about 15 to 60 parts per 100 parts by weight of the polybutadiene and comprises a salt of at least one metal selected from the group consisting of zinc, magnesium and calcium, and at least one acid selected from the group consisting of methacrylic, acrylic, cinnamic, acotinic, crotonic, vinylacetic, itaconic, styrenesulfonic and benzoylacrylic acids.

9. The process of claim 7, wherein said golf ball is a unitary golf ball, said elastomer comprises polybutadiene, said metal containing cross-linkable monomer is present in about 15 to 60 parts per 100 parts by weight of the polybutadiene and comprises a salt of at least one acid selected from the group consisting of methacrylic, acrylic, cinnamic, acotinic, crotonic, vinylacetic, itaconic, styrenesulfonic and benzoylacrylic acids, and said additional filler comprises about 10 to 20 parts by weight of zinc oxide per 100 parts by weight of the polybutadiene.

* * * * *

UNITED STATES PATENT AND TRADEMARK OFFICE
CERTIFICATE OF CORRECTION

PATENT NO. : 4,065,537
DATED : December 27, 1977
INVENTOR(S) : Richard Miller et al It is certified that error appears in the above-identified patent and that said Letters Patent are hereby corrected as shown below:

| | |
|---|---|
| Col. 1, line 46 | Cancel "mixerextruder", insert --mixer-extruder--. |
| Col. 1, line 48 | Cancel "presure", insert --pressure--. |
| Col. 2, line 68 | Cancel "$(RPO_3)_9$", insert --$(RPO_3)_q$--. |
| Col. 3, line 7 (left-hand formula) | Insert --and-- after "M "," . |
| Col. 4, line 19 | Cancel "butadieneacrylonitrile- insert --butadiene-acrylonitrile--. |
| Col. 5, line 32 | Insert --mesh-- after "60". |
| Col. 10, line 41 | Cancel "has", insert --had--. |
| Col. 11, line 32 | Cancel "174", insert --1/4--. |
| Col. 11, line 32 | Cancel "thich", insert --thick--. |
| Col. 12, line 25 | Cancel "$\pi$", insert --#--. |
| Col. 13, line 22 | Cancel "1/8" (1st occurr.), insert --7/8--. |

UNITED STATES PATENT AND TRADEMARK OFFICE
CERTIFICATE OF CORRECTION

PATENT NO. : 4,065,537
DATED : December 27, 1977
INVENTOR(S) : Richard Miller et al It is certified that error appears in the above-identified patent and that said Letters Patent are hereby corrected as shown below:

| | |
|---|---|
| Col. 14, line 20 | Cancel "$\pi$", insert --#--. |
| Col. 14, line 26 | Cancel "were"(1st occurr.), insert--was--. |
| Col. 14, line 52 | Insert--Diff.-- above"P-E  E-E". |
| Col. 14, line 66 | Cancel "$\pi$", insert--#--. |
| Col. 14, line 67 | Cancel "cispolybutadiene", insert--cis-polybutadiene--. |
| Col. 15, line 56 | Cancel "$\pi$", insert--#--. |
| Col. 15, line 57 | Cancel "cispolybutadiene", insert--cis-polybutadiene--. |
| Col. 16, line 20 | Cancel "$\pi$", insert--#--. |
| Col. 17, line 3 | Cancel "$\pi$", insert--#--. |

UNITED STATES PATENT AND TRADEMARK OFFICE
CERTIFICATE OF CORRECTION

PATENT NO. : 4,065,537

DATED : December 27, 1977

INVENTOR(S) : Richard Miller et al.

It is certified that error appears in the above-identified patent and that said Letters Patent are hereby corrected as shown below:

Col. 17, line 39          Cancel "77", insert--#--.

Col. 17, line 40          Cancel "cispolybutadiene" insert--cis-polybutadiene--.

Signed and Sealed this

Twenty-fifth Day of July 1978

[SEAL]

Attest:

RUTH C. MASON
Attesting Officer

DONALD W. BANNER
Commissioner of Patents and Trademarks